United States Patent
Ohmori et al.

(10) Patent No.: US 7,448,120 B2
(45) Date of Patent: Nov. 11, 2008

(54) APPARATUS AND METHOD FOR MACHINING LONG WORKPIECE

(75) Inventors: Hitoshi Ohmori, Wako (JP); Norihide Mitsuishi, Tokyo (JP); Takahiro Miura, Nagoya (JP); Naoshi Iwamitsu, Nagoya (JP)

(73) Assignees: Riken, Saitama (JP); The NEXSYS Corporation, Tokyo (JP); Ikegami Precision Tooling Co., Ltd., Aichi (JP)

( * ) Notice: Subject to any disclaimer, the term of this patent is extended or adjusted under 35 U.S.C. 154(b) by 0 days.

(21) Appl. No.: 11/680,054

(22) Filed: Feb. 28, 2007

(65) Prior Publication Data
US 2007/0199187 A1 Aug. 30, 2007

(30) Foreign Application Priority Data
Feb. 28, 2006 (JP) .............................. 2006-052385

(51) Int. Cl.
*B23P 23/00* (2006.01)
(52) U.S. Cl. .................. 29/27 C; 269/902; 269/258; 269/296; 269/289 MR; 82/162; 82/164; 409/167
(58) Field of Classification Search ............... 29/27 C, 29/27 R; 269/902, 258, 296, 289 MR; 82/162–164; 409/165, 167
See application file for complete search history.

(56) References Cited

U.S. PATENT DOCUMENTS

| 2,320,079 | A | * | 5/1943 | Hartwig ...................... 269/69 |
| 3,521,875 | A | | 7/1970 | Kapelsohn |
| 3,868,101 | A | * | 2/1975 | Nozaki et al. ................. 269/25 |
| 5,343,603 | A | * | 9/1994 | Pioch ........................ 29/27 C |
| 6,483,075 | B1 | * | 11/2002 | Yamazaki et al. ...... 219/121.82 |
| 6,634,072 | B2 | * | 10/2003 | Ohmori et al. ............. 29/26 A |
| 7,237,309 | B2 | * | 7/2007 | Nicaise ...................... 29/27 C |

FOREIGN PATENT DOCUMENTS

| JP | 56-67932 | 6/1981 |
| JP | 10-156651 | 6/1998 |
| JP | 2002-301631 | 10/2002 |
| WO | WO-03/047813 A1 * | 6/2003 |

* cited by examiner

*Primary Examiner*—Erica E Cadugan
(74) *Attorney, Agent, or Firm*—Griffin & Szipl, P.C.

(57) ABSTRACT

There are provided a base frame 12 positioned below a horizontal axis O; a pair of clamp units 14 positioned at the two ends above the base frame; a pair of support units 16 that horizontally support the long workpiece in two locations, and that are capable of moving vertically; and machining units 18 that are capable of machining the long workpiece. The two clamp units 14 are capable of moving from the outside toward the inside, which support the long workpiece in two locations, and rotate around the horizontal axis O in synchronization with each other.

4 Claims, 7 Drawing Sheets

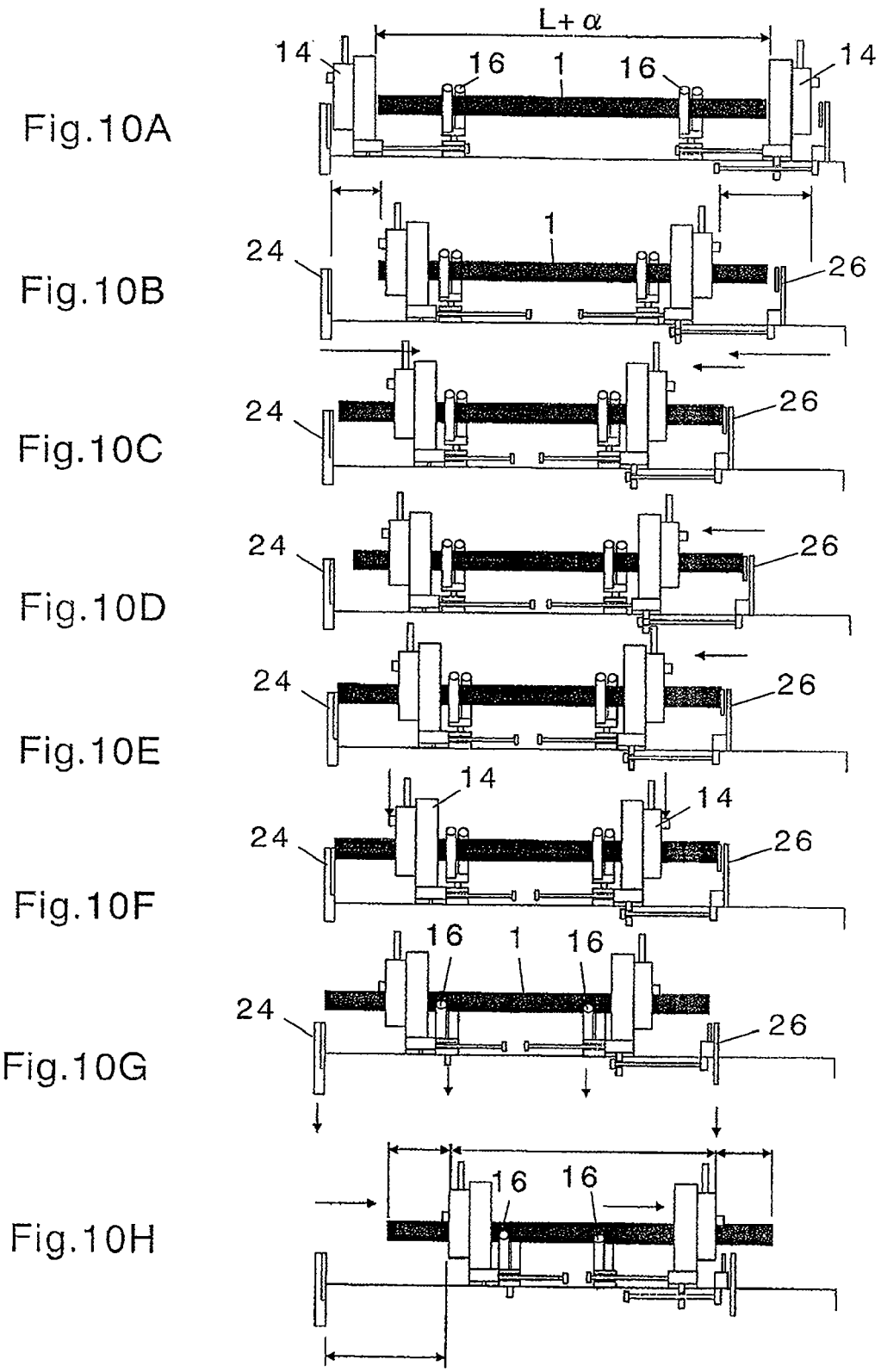

APPARATUS AND METHOD FOR MACHINING LONG WORKPIECE

This application claims priority from Japanese Patent Application No. 052385/2006, filed Feb. 28, 2006, the entire disclosure of which is incorporated herein by reference.

BACKGROUND OF THE INVENTION

1. Technical Field of the Invention

The present invention relates to a machining apparatus and method for machining long workpiece having a constant sectional shape.

2. Description of the Related Art

Various workpieces of continuous lengths, which have constant section shape, have been used as general building workpieces such as an aluminum sash. In this application such workpieces of continuous lengths are referred as "long workpieces".

Patent Documents 1 and 2 disclose examples of apparatuses that process long workpieces such as I-beams and H-section steel.

The rotatable handling device in Patent Document 1 is constituted of positioning units 50, 51 for supporting the proximities of the ends of an I-beam 54, as shown in FIG. 1. The positioning unit 50 is attached to the top of a driving roller unit 53. The positioning unit 51 is attached to the top of a driven roller unit 54 that is in contact with the driving roller, and the positioning unit 51 rotates in synchronization with the frictional force.

The "Supporting Apparatus for Structural Steel" in Patent Document 2 comprises a base 61, supporting rollers 66, 67 disposed on top of the base, a ring-shaped frame 68 that is rotatably mounted on these supporting rollers and that can be opened and closed at one part, a rotation drive mechanism that fits over the external periphery of the ring-shaped frame and that rotates the ring-shaped frame, and a mechanism that is provided on the inside of the ring-shaped frame and that supportably fixes H-section steel or other such structural steel in the center of the ring-shaped frame, as shown in FIG. 2.

Patent Documents 3 and 4 have already disclosed examples of machining apparatuses for continuous-length, irregularly shaped workpieces, such as aluminum sashes.

The "Fixing Method and Apparatus for workpiece" in Patent Document 3 comprises a holding plate 74 for holding workpiece, and a clamper 75 for pressing down on the workpiece, wherein the clamper 75 comprises a pressing part 71 that moves back and forth in relation to the holding plate and presses down on the workpiece, and the pressing part 71 is a balloon, as shown in FIG. 3.

The "MACHINING APPARATUS AND EQUIPMENT OF THIN SECTION LONG WORKPIECE" in Patent Document 4 comprises a workpiece clamp device 80 for horizontally holding the thin section long workpiece. This thin workpiece either has a constant sectional shape or has the same sectional shape at intervals in a longitudinal direction. This workpiece clamp device 80 is constituted of a driving clamp device 80A and a driven clamp device 80B that both have a holding device 82, wherein the driving clamp device rotatably drives the thin section long workpiece around a horizontal axis O extending in the length direction, and the driven clamp device is driven by the thin section long workpiece to idle around the horizontal axis.

[Patent Document 1]
U.S. Pat. No. 3,521,875 Specification, "Rotatable Handling Device"

[Patent Document 2]
Utility Model Application No. 54-148285, "Supporting Apparatus for Structural Steel"

[Patent Document 3]
Japanese Patent Application Laid-open No. 10-156651 "Fixing Method and Apparatus for workpiece"

[Patent Document 4]
Japanese Patent Application Laid-open No. 2002-301631 "Machining Apparatus and Machining Equipment for Thin Section Long Workpiece"

The conventional long workpiece machining apparatuses described above have the following problems.
(1) With the apparatuses in Patent Documents 1 and 2, an exclusive-use jig that matches the sectional shape of the workpiece is needed to fix the workpiece in place.
(2) With the apparatus in Patent Document 3, about ¼ of the frame 77 and the rotor 78 is cut out, and it is therefore impossible to process about ¼ of the article with each rotation. Therefore, the workpiece must be rotated in the reverse direction in cases in which the entire periphery must be machined.
(3) With the apparatus in Patent Document 4, the entire periphery can be machined without reverse rotation, but since workpieces must be conveyed in and out in the longitudinal direction, the workspace must have about twice the length of one workpiece.
(4) With the apparatuses in Patent Documents 1 through 4, the held portions of the workpieces interfere with the holding devices and the machining apparatus, making it difficult to machine the held portions as such, and making machining impossible at least in automatic operation.

SUMMARY OF THE INVENTION

The present invention has been developed in order to solve these problems. That is, an object of the present invention is to provide a machining apparatus and method for a long workpiece, wherein no exclusive-use jigs that match an irregular shape are needed even if the workpieces have continuous-lengths and irregular shapes, the workpieces do not need to be rotated in the reverse direction even when the entire periphery of the long workpiece is machined, no extra space is needed to convey the long workpiece in and out, and the held portions of the long workpiece can be automatically machined, whereby machining of a continuous-length, irregularly shaped workpiece can be automated other than at times during which the workpieces are being conveyed in or out.

According to the present invention, there is provided a long workpiece machining apparatus for machining a long workpiece having a constant sectional shape while rotating the long workpiece around a horizontal axis O extending in the length direction of the long workpiece, the long workpiece machining apparatus comprising:

a base frame that is positioned below the horizontal axis O and that extends along the horizontal axis O;

a pair of clamp units that are positioned at the two ends of the base frame;

a pair of support units that are positioned in the lengthwise inside of the clamp units, that are capable of moving along movement guides disposed parallel to the horizontal axis O, that horizontally support the long workpiece in two locations, and that are capable of moving vertically; and one or a plurality of machining units that are capable of moving over the base frame along the movement guides disposed parallel to the horizontal axis O, and that are capable of machining the long workpiece; wherein the clamp units are capable of moving from the outside of the ends of the long workpiece toward the inside;

the clamp units horizontally support the long workpiece in two locations; and the clamp units rotate in synchronization with each other around the horizontal axis O.

According to a preferred embodiment of the present invention, each of the clamp units comprises a cylindrical ring that has a cylindrical inner surface and is supported so as to be rotatable around the horizontal axis O; an intersecting flat member which is attached to the inner surface of the cylindrical ring and which has two flat surfaces extending in parallel with the horizontal axis and crossing each other; and a holding head disposed in the cylindrical ring in a position opposite to the intersecting flat member, directly moved in a diametrical direction toward the intersecting flat member, and freely rocked around an axis parallel to the horizontal axis O.

Each of the support units has a pair of free-rotating rollers that are supported at the lower ends so as to rotate freely around an axis, and that intersect with each other to form a V shape that opens upward;

the free-rotating rollers are capable of moving along the horizontal axis O in the lengthwise inside of the clamp units, and are also capable of vertical movement; and while the free-rotating rollers are at raised positions, the V shapes are coplanar with V shapes of the upper surfaces of the intersecting flat members of the clamp units when the intersecting flat members are at bottom positions.

Each of the machining units comprises a high-speed spindle for rotating rotary tools at high speeds; and a tool-moving device for moving the rotary tool in two dimensions within a plane orthogonal to the horizontal axis O.

The long workpiece machining apparatus also comprises an NC control device for numerically controlling the horizontal movement positions and rotational angles of the clamp units as well as the positions of the rotary tools of the machining units; and a sequence control device for controlling the sequence of the units.

In a preferred aspect, the long workpiece machining apparatus comprises a stationary-side stopper sensor that is fixed to one end of the base frame and that comes into contact with one end of the long workpiece and outputs a detection signal; and a moving-side stopper sensor that is capable of moving from the other end of the base frame to the first end along the horizontal axis O, and that comes into contact with the other end of the long workpiece and outputs a detection signal.

According to the present invention, there is provided a long workpiece machining method for machining a long workpiece having a constant sectional shape while rotating the long workpiece around a horizontal axis O extending in the length direction of the long workpiece, the method comprising:

moving a pair clamp units horizontally over a base frame extending along the horizontal axis O, toward the outsides of the two ends of the long workpiece;

moving a pair of support units positioned in the lengthwise inside of the clamp units, horizontally inward from the two ends of the long workpiece and also to raised positions;

conveying the long workpiece in from above and horizontally supporting the workpiece in two locations on the pair of support units;

moving the clamp units horizontally toward the inside of the long workpiece and horizontally supporting the long workpiece in two locations;

moving the support units to lowered positions and separating the units from the long workpiece;

rotating the clamp units around the horizontal axis O in synchronization with each other to specific positions;

moving one or a plurality of machining units horizontally over the base frame in the length direction; and machining the long workpiece by the machining units.

According to a preferred embodiment of the present invention, the method comprises:

moving the support units to raised positions, and supporting the long workpiece in two locations;

releasing the clamp units and moving the units horizontally in the length direction of the long workpiece to horizontally support the long workpiece in two different locations; and moving the support units to lowered positions and separating the units from the long workpiece.

According to a preferred aspect, the method comprises:

moving a moving-side stopper sensor along a horizontal axis O from the other end of the base frame to the first end and bringing the sensor into contact with the other end of the long workpiece to detect the other end position of the long workpiece;

moving the moving-side stopper sensor further toward the first end along the horizontal axis O to horizontally move the long workpiece; and bringing a stationary-side stopper sensor fixed in place at the first end of the base frame into contact with the first end of the long workpiece and stopping the moving-side stopper sensor, thereby positioning the long workpiece.

In cases in which non-contact sensors (lasers, phototransistors, capacitance sensors, eddy-current sensors, or the like) are used, the ends of the workpiece can be detected without contact.

According to the apparatus and method of the present invention, each of the clamp units comprises an intersecting flat member attached to the inner surface of a cylindrical ring, and also comprises a holding head directly moved in a diametrical direction toward the intersecting flat member and freely rocked around an axis parallel to the horizontal axis O. Accordingly, there is no need for an exclusive-use jig that matches the sectional shape of a continuous-length, irregularly shaped workpiece.

Also, un-notched cylindrical rings are supported so as to be capable of rotating around the horizontal axis O. Therefore, the rings can rotate 360°, and the machined object does not need to be rotated in the opposite direction even in cases in which the entire peripheral surface of the long workpiece is machined.

The two clamp units can move toward the outside of the ends of the long workpiece and can be moved horizontally to convey the long workpiece in or out. Therefore, extra space is not needed to convey the long workpiece in or out.

The two support units are moved to their raised positions to horizontally support the long workpiece at two locations, the clamp units are released and moved horizontally in the length direction of the long workpiece, the long workpiece is held horizontally at two different locations, and the two support units are then moved to their lowered positions and separated from the long workpiece. Machining of the held portions of the long workpiece can thereby be automatically machined, whereby machining of a continuous-length, irregularly shaped workpiece can be automated other than at times during which the workpiece is conveyed in and out.

Other objects and advantageous characteristics of the present invention will be apparent from the following description with reference to the accompanying drawings.

BRIEF DESCRIPTION OF THE DRAWINGS

FIGS. 10A through 10H are explanatory diagrams of the sequence of the long workpiece machining method according to the present invention.

DETAILED DESCRIPTION OF THE PREFERRED EMBODIMENTS

Figure 1:
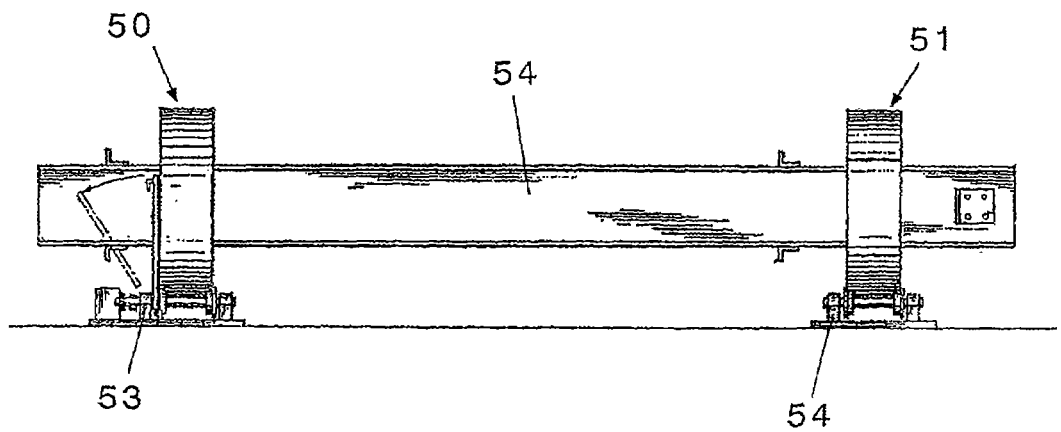
FIG. 1 is a schematic diagram of the apparatus in Patent Document 1.
Figure 2:
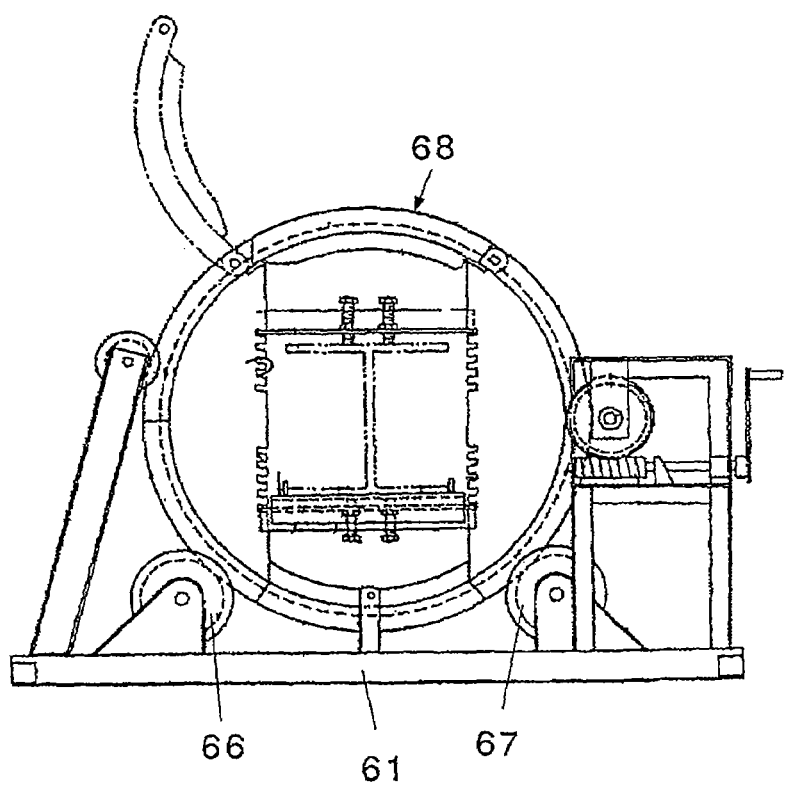
FIG. 2 is a schematic diagram of the apparatus in Patent Document 2.
Figure 3:
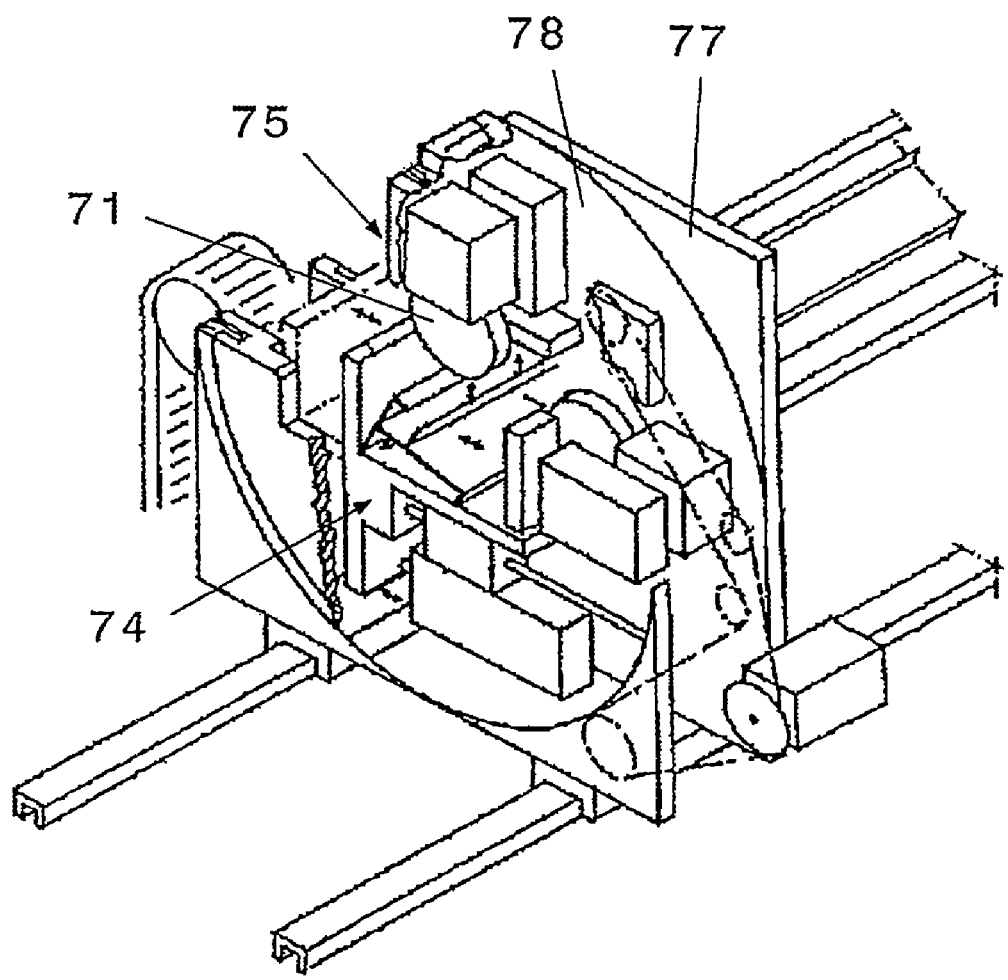
FIG. 3 is a schematic diagram of the apparatus in Patent Document 3.
Figure 4:
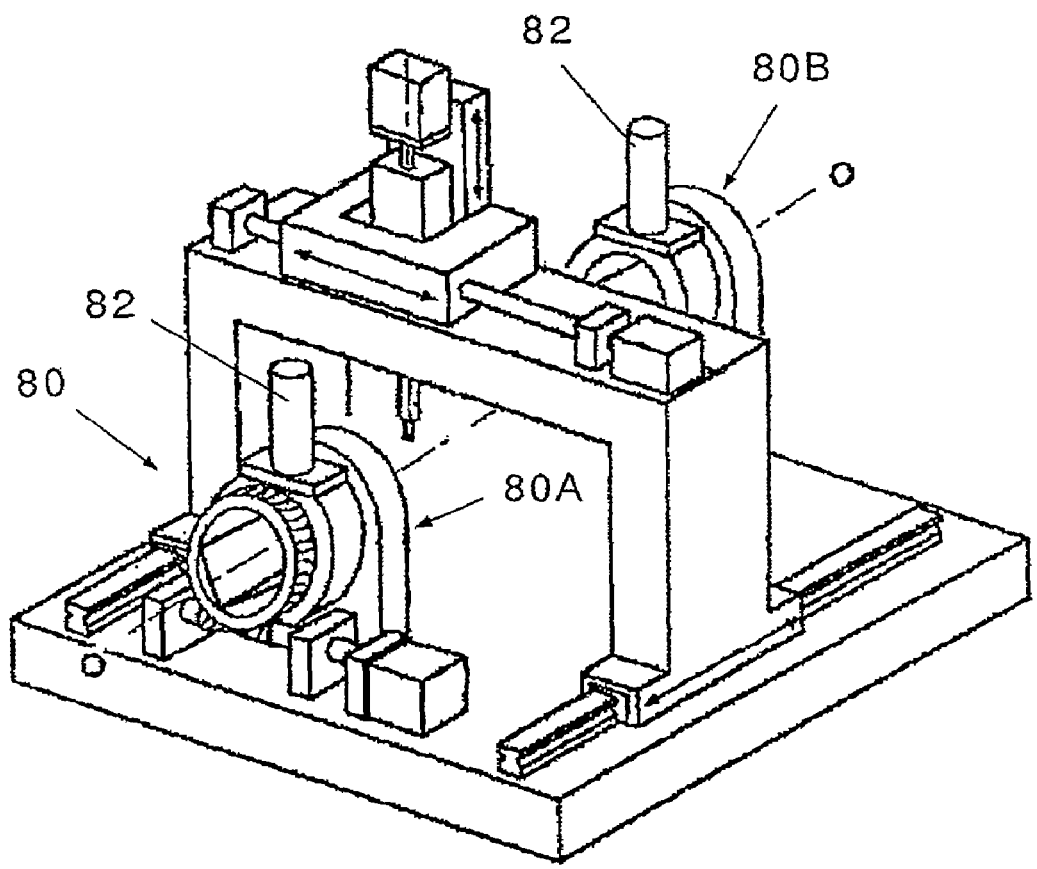
FIG. 4 is a schematic diagram of the apparatus in Patent Document 4.

Preferred embodiments of the present invention will be described hereinafter with reference to the drawings. Additionally, common portions are denoted with the same reference numerals in the respective drawings, and redundant description is omitted.

Figure 5:
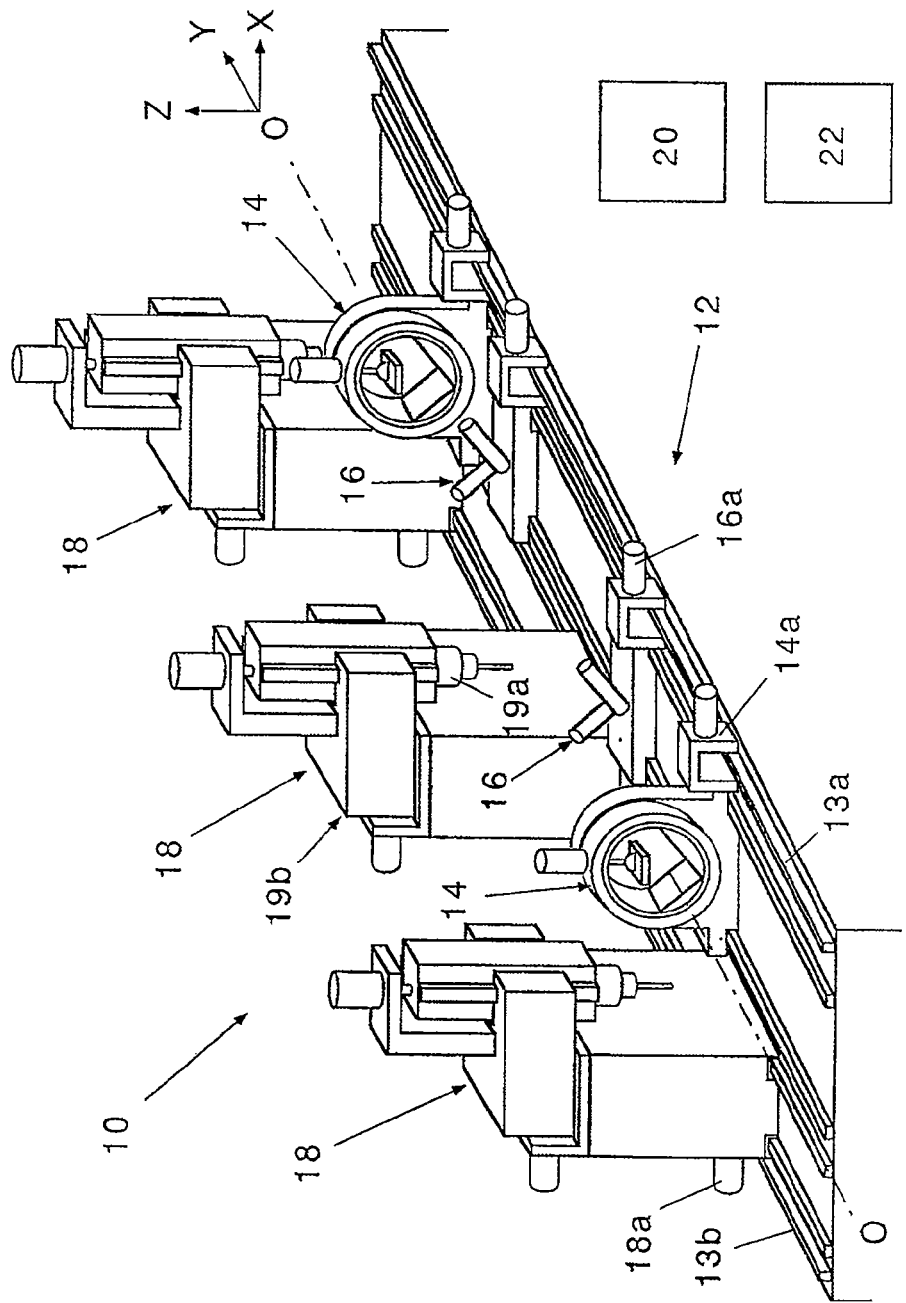
FIG. 5 is a whole perspective view of a machining apparatus of the long workpiece according to the present invention.

FIG. 5 is a whole perspective view of the machining apparatus of long workpiece according to the present invention. The long workpiece machining apparatus 10 is a machining apparatus for machining long workpiece (not shown) while rotating the workpiece around the center of a horizontal axis O extending in the length direction of the long workpiece, which has a constant sectional shape. The long workpiece machining apparatus 10 comprises a base frame 12, a pair of clamp units 14, a pair of support units 16, and one ore more machining units 18.

The base frame 12 is positioned below the horizontal axis O and extends along the horizontal axis O. Backlash-free rack and pinion mechanisms, e.g., trochoid cam gear runners or movement guides 13a, 13b, are disposed on the base frame 12. The clamp units 14, the support units 16, and the machining units 18 are capable of moving from one end of the base frame 12 to the other, along movement guides disposed parallel to the horizontal axis O.

The base frame 12 is configured from a combination of fixed-length units (e.g., 1 m in length). Therefore, the length of the base frame can be rearranged in accordance with the length of the machined workpiece.

Figure 6:
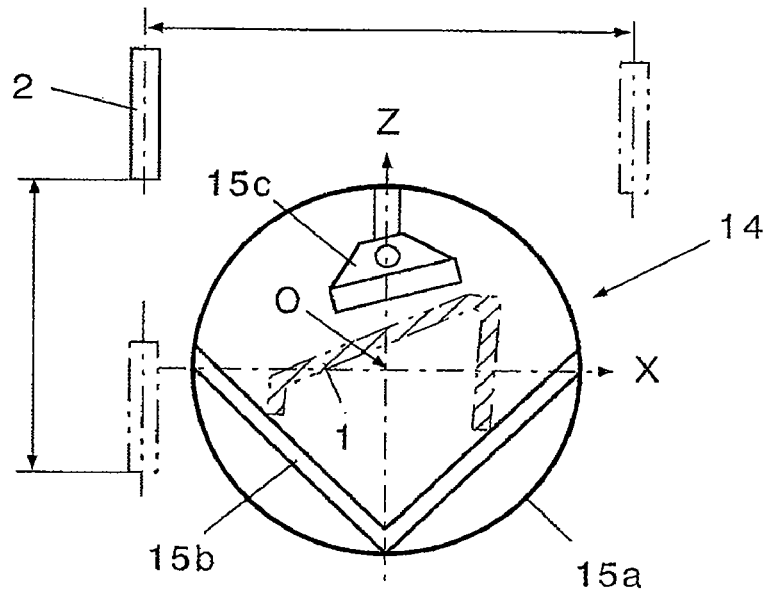
FIG. 6 is an explanatory diagram of a clamp unit and a machining unit constituting the machining apparatus of the present invention.

FIG. 6 is an explanatory diagram of the clamp units and machining units constituting the machining apparatus of the present invention.

The clamp units 14 are positioned at the ends on the base frame 12, as shown in FIGS. 5 and 6.

The clamp units 14 comprise cylindrical rings 15a having cylindrical internal surfaces, intersecting flat members 15b having two mutually intersecting planar surfaces, and holding heads 15c that rock freely around an axis parallel to the horizontal axis O as shown in FIG. 6.

The horizontal axis O is the center axis of the cylindrical rings 15a, and the cylindrical rings 15a are supported by bearings (not shown) while allowed to rotate around the horizontal axis O.

The intersecting flat members 15b are removably attached with bolts (not shown) to the internal surfaces of the cylindrical rings 15a. The intersecting flat members 15b also have two planar surfaces on the insides. These two planar surfaces are parallel to the horizontal axis O and intersect with each other to form a V-shaped component support surface at the intersection. The angle formed by the two planar surfaces is preferably 90°.

The holding heads 15c are provided inside the cylindrical rings at positions facing the intersecting flat members 15b, and are moved in straight lines in a diametrical direction toward the intersecting flat members by linear cylinders (e.g., air cylinders). The holding heads 15c are capable of rocking freely around pins that are parallel to the horizontal axis O. Furthermore, elastic members (e.g., urethane rubber) are attached to the sides of the holding heads 15c facing the intersecting flat members to prevent damage to long workpiece 1.

The two clamp units 14 further comprise worm wheels fixed to the cylindrical rings 15a, and worm drive mechanisms (not shown) having worms that mesh with the worm wheels. The long workpiece 1, which is held between the intersecting flat members 15b and the holding heads 15c, is numerically controlled to freely rotate 360° around the horizontal axis O.

Due to the above-described configuration, when the long workpiece 1 has a complicated, irregularly shaped section, the long workpiece 1 is contacted in at least three contact points, including the contact points with the two planar surfaces and the contact point with the holding head 15c, and the long workpiece can be reliably fixed in place so as to withstand resistance during machining.

Also, the pair of clamp units 14 can endlessly move from the outside of the two ends of the long workpiece toward the inside, and also from one end of the base unit to the other. This movement is made possible by the trochoid cam gear runner 13b and a drive device 14a that meshes with the trochoid cam gear runner. The clamp units also hold the long workpiece 1, the clamp units are driven synchronously by two servomotors (not shown), and the clamp units can rotate 360° in synchronization with each other around the horizontal axis O.

Figure 7:
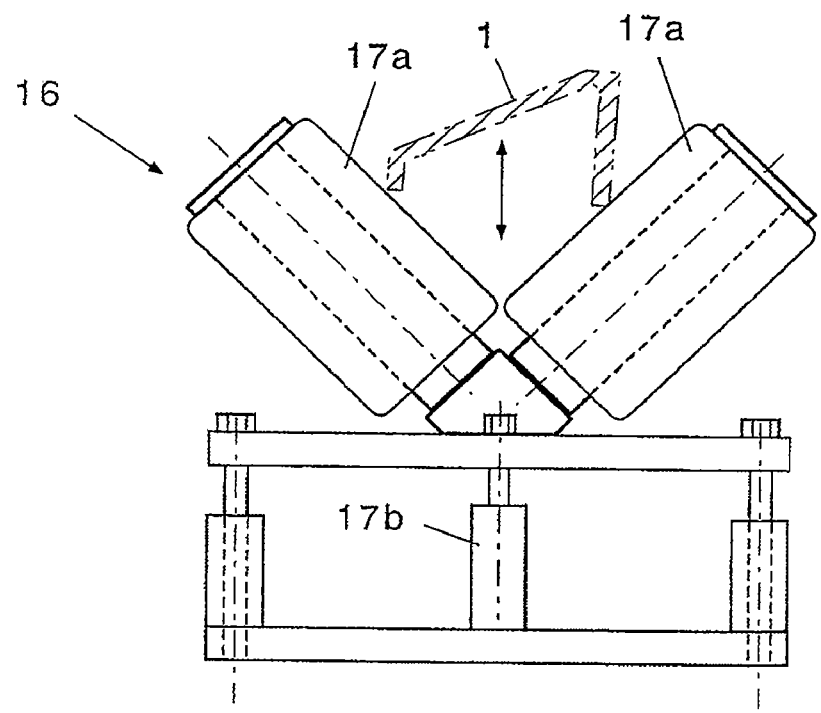
FIG. 7 is a front view of a support unit constituting the machining apparatus of the present invention.

FIG. 7 is a front view of a support unit constituting the machining apparatus of the present invention.

The two support units 16 are positioned inside of the clamp units 14 in the length direction and are capable of moving along the horizontal axis O, as shown in FIG. 5. The support units are configured to move vertically and to support the long workpiece in two locations.

Each of the support units 16 has a pair of free-rotating rollers 17a that are supported at the lower ends to rotate freely around the axial centers, and that intersect in the form of an upwardly open V shape, as shown in FIG. 7.

The free-rotating rollers 17a are capable of moving along the horizontal axis O in the lengthwise inside of the clamp units 14, and can also be moved vertically by raising/lowering actuators 17b.

At the raised positions of the free-rotating rollers 17a, the V shapes formed by the upper surfaces of the free-rotating rollers 17a are coplanar with the V shapes of the upper surfaces of the intersecting flat members 15b of the clamp units 14 when the intersecting flat members 15b rotate to their lower positions.

Furthermore, the support units 16 are capable of endlessly moving from the outside of the two ends of the long workpiece toward the inside, and also from one end of the base unit to the other. This movement is made possible by a backlash-free rack and pinion mechanism (e.g., the trochoid cam gear runner 13a) and a drive device 16a that meshes with this mechanism.

With the above-described configuration, the V shapes formed by the upper surfaces of the free-rotating rollers 17a are co-planar with the V shapes of the upper surfaces of the intersecting flat members 15b when the free-rotating rollers 17a move to their raised positions and the intersecting flat members 15b of the clamp units 14 rotate to their lower positions. Therefore, support can be alternated between the clamp units 14 and the support units 16 while the same long workpiece 1 is stably supported at two points.

In FIG. 5, one or more machining units 18 are capable of moving above the base frame 12 along the horizontal axis O, by means of a backlash-free rack and pinion mechanism (e.g., the trochoid cam gear runner 13a) and a drive device 18a that meshes with this mechanism.

In FIGS. 5 and 6, the machining units 18 are triaxially driven milling units that are equipped with high-speed spindles having a maximum rotational speed of 60,000 rpm or greater and are enabled to move endlessly (Y axis) along the X axis, along the Z axis, and over the base frame 12.

The machining units 18 comprise and tool-moving devices 19b and high-speed spindles 19a for rotating rotary tools 2 at high speeds.

The rotary tools 2 are drills, end mills, whetstones, or the like, for example. The rotary tools 2 are preferably constituted of electroconductive whetstones, and these tools preferably comprise electrolytic dressing device.

The tool-moving devices 19b move the rotary tools 2 in two dimensions within a plane (X-Z plane) orthogonal to the horizontal axis O.

A plurality of machining units 18 can be installed according to the line layout and the machining cycle time.

With the above-described configuration, the long workpiece 1 can be machined by moving the machining units 18 to arbitrary positions on the base frame 12 and moving the rotary tools 2 in two dimensions within the X-Z plane.

The long workpiece machining apparatus 10 of the present invention comprises an NC control device 20 and a sequence control device 22. The NC control device 20 numerically controls the parallel movement positions, the movement speeds, and the rotational angles of the clamp units 14; and the rotational speeds, positions, and movement speeds of the rotary tools 2 of the machining units 18. The sequence control device 22 also controls the sequence of the units 12, 14, 16, and 18.

Signal wires for transmitting drive commands, as well as electrical wires for generating the drive force needed to drive the clamp units 14, the support units 16, and the machining units 18 are placed along the movement guides on the horizontal axis O without interfering with the drive. The clamp units 14, the support units 16, and the machining units 18 are supplied with power, signals, and the like by power supply means (brushes or the like), and these units are controlled and driven by the NC control device 20 and the sequence control device 22.

The signal wires can be controlled with the use of a wireless LAN and without the use of power supply means, in which case only the electrical wires are placed along the movement guides.

In cases in which a plurality of machining units 18 are installed, both the units in which the rotational axes of the rotary tools are parallel to the Z direction (longitudinal), and the units in which the axes are parallel to the X axis (transverse) can be provided, and these two types of units can process workpieces simultaneously.

The configuration is also designed so that the units and sensors do not interfere with each other during movement of the clamp units 14, the support units 16, a stationary-side stopper sensor 24, and a moving-side stopper sensor 26.

For example, an NC program can be used to specify in advance the movement range in the movement guides on the base frame so that the pair of clamp units and the pair of support units do not interfere (collide) with each other during positioning. Exchanging coordinate information between units also makes it possible to prevent interference by using a simple program.

For example, an operation in which interference is automatically prevented can be performed by providing the NC device with an algorithm as an existing program whose conditions are that the difference in coordinates between one clamp unit and the nearby support unit is equal to or greater than the length (along the horizontal axis O) of both units; that the distance between the support units satisfies the same relationship; that the distance between the clamp units is governed by a distance relationship established with consideration for the lengths of the clamp units, the distance between the support units, and the lengths of the support units; and the like.

In cases in which a single machining unit is used, the above-described ideas are applied to prevent interference with the pair of clamp units, whether the machining unit is placed inside or outside of the clamp units. In other words, in cases in which the machining unit is between the clamp units, the distance between the clamp units must be equal to or greater than the sum of the lengths of the clamp units and the length of the machining unit. In cases in which the machining unit is outside of the clamp units, an algorithm is used whose condition is that the distance between the stopper sensor or the end of the base frame and the clamp unit proximate to the machining unit be either equal to or greater than the sum of the lengths of the stopper sensor and the machining unit, or equal to or greater than the length of the machining unit.

In cases in which a plurality of units are used, an algorithm is created for preventing interference in accordance with the same principle, but setting moveable ranges for the units and sensors as parameters in advance makes faster driving possible without establishing the above-described conditions. These options can be determined and selected according to the simplicity and efficiency of the program, and the writing of the program can be formulated according to the number of machining units.

For example, in cases in which a plurality of machining units are used, a machining zone may be established for each machining unit, and a program may be written for each machining unit. In cases in which a single program (i.e., assuming an operation in which a single machining unit moves within a wide range) is written and a plurality of machining units are used, the program can be automatically divided according to the zones of the corresponding machining units, and an algorithm can be created to enable the units to be driven simultaneously.

With this type of algorithm, the present invention provides an apparatus and method whereby the number of machining units, the joint use of longitudinal and transverse units, and the like can be freely increased and reduced according to the long workpiece and the machining requirements (machining locations, efficiency, degree of difficulty).

Figure 8A:
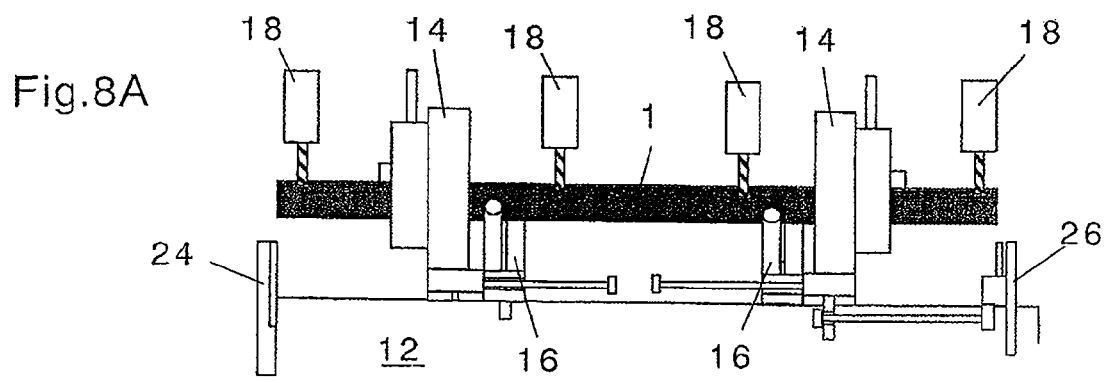
FIGS. 8A and 8B are schematic diagrams showing composite machining of long workpiece with the machining apparatus of the present invention.
Figure 8B:
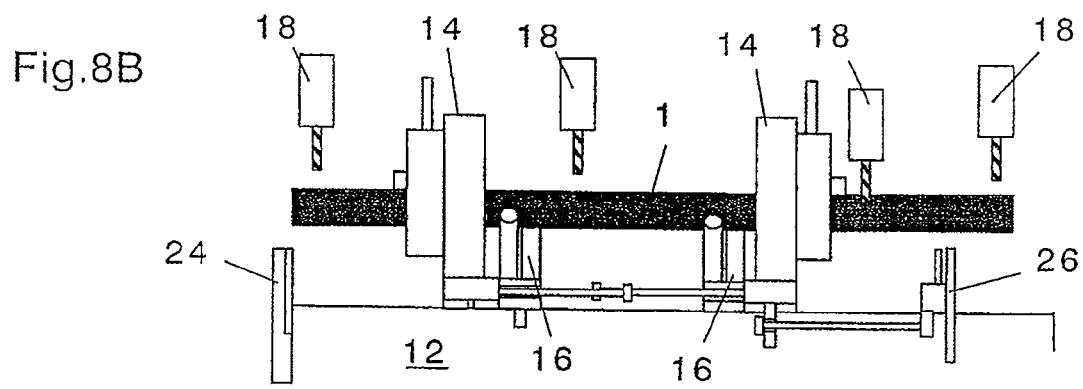

FIGS. 8A and 8B are schematic diagrams showing composite machining of long workpiece by the machining apparatus of the present invention.

The long workpiece machining apparatus 10 of the present invention further comprises a vertically movable stationary-side stopper sensor 24 and moving-side stopper sensor 26.

The stationary-side stopper sensor 24 is fixed in place at one end of the base frame 12 but is allowed vertical movement, and this sensor comes into contact with one end of the long workpiece 1 and outputs a detection signal. The moving-side stopper sensor 26 is capable of moving along the horizontal axis O from the other end of the base frame 12 toward the first end, and this sensor comes into contact with the other end of the long workpiece 1 and outputs a detection signal. The moving-side stopper sensor 26 is also capable of moving vertically at an arbitrary position.

In cases in which non-contact sensors (lasers, phototransistors, capacitance sensors, eddy-current sensors, or the like) are used, the ends of the workpiece can be detected without contact.

FIG. 8A shows composite machining in which the optimal clamping position is set during the machining program settings, the long workpiece 1 is held horizontally at this position by two clamp units 14, and the same machining surface is simultaneously machined by four machining units 18.

FIG. 8B shows a state in which the same long workpiece 1 is stabilized and supported both by the clamp units 14 and by the support units 16, and one of the clamp units 14 is moved to process the workpiece during machining of the areas held by the clamp units 14.

With the machining method shown in FIGS. 8A and 8B, the held portions of the long workpiece 1 can be machined, and machining a plurality of locations simultaneously can increase the machining speed. Also, this machining can be automated with the NC control device 20 and the sequence control device 22.

Figure 9:
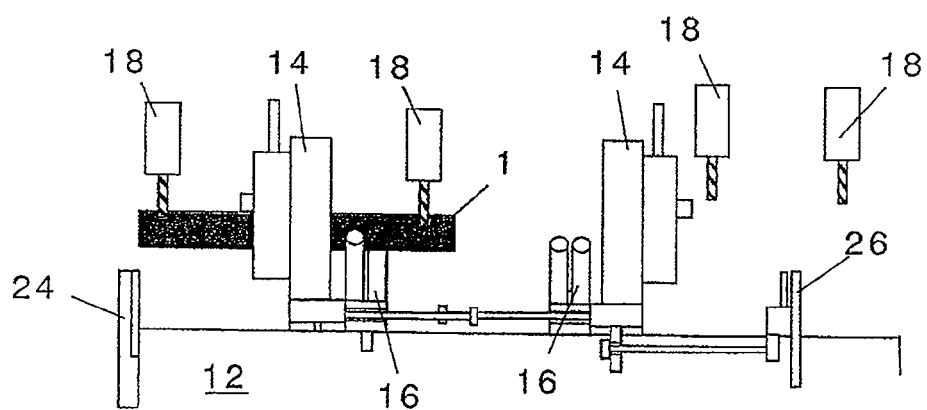
FIG. 9 is a schematic diagram showing both ends of a short workpiece being machined by the machining apparatus of the present invention.

FIG. 9 is a schematic diagram showing both ends of a short workpiece being machined by the machining apparatus of the present invention. A short workpiece 1 can be stabilized and supported with a single clamp unit 14 and a single support unit 16, and both ends of the short workpiece can be machined simultaneously, as shown in this diagram.

FIGS. 10A through 10H are explanatory diagrams of the sequence of the long workpiece machining method according to the present invention. The long workpiece machining method of the present invention is performed in the sequence shown in FIGS. 10A through 10H.

In FIG. 10A, the entire length L of the long workpiece 1 is inputted, and the pair of clamp units 14 is moved horizontally toward the ends of the long workpiece 1 over the base frame 12 extending along the horizontal axis O, until the gap between the clamp units is equal to the entire length L+α (allowance). The two support units 16, which are positioned in the lengthwise inside of the clamp units 14, are moved horizontally inward from the two ends of the long workpiece 1 and are moved to their raised positions. The long workpiece 1 is conveyed in from above in this state and is supported horizontally in two locations on the two support units, whereby the conveyance of the long workpiece 1 is completed.

In FIG. 10B, the two clamp units 14 are moved horizontally inwards from the two ends of the long workpiece 1. The moving-side stopper sensor 26 is moved quickly in this state to stop in front (e.g., 10 mm) of the right end of the long workpiece 1.

In FIG. 10C, the moving-side stopper sensor 26 is moved from the other end of the base frame toward the first end along the horizontal axis O, and the long workpiece 1 is moved until the left end of the long workpiece 1 in the diagram stops in front (e.g., 10 mm) of the stationary-side stopper sensor 24.

In FIGS. 10D and 10E, the moving-side stopper sensor 26 is moved in steps until the stationary-side stopper sensor 24 comes into contact with the left end of the long workpiece 1, and the moving-side stopper sensor 26 is stopped when contact is made at the left end of the diagram.

In FIG. 10F, the long workpiece 1 is held (clamped) in two locations by the two clamp units 14.

In FIG. 10G, the stopper sensors 24, 26 and the two support units 16 are moved to their lowered positions and separated (released) from the long workpiece 1.

In FIG. 10H, the long workpiece 1 is moved while clamped by the two clamp units 14 in order to secure a machining area on the left side of the diagram. The one or more machining units are then moved horizontally over the base frame in the length direction, and these machining units process the long workpiece 1.

According to the apparatus and method of the present invention described above, the clamp units 14 comprise intersecting flat members 15b attached to the internal surfaces of the cylindrical rings 15a, and holding heads 15c that move in a straight line toward the intersecting flat members 15b and that rock freely around axes parallel to the horizontal axis O. Therefore, if the machined object is a continuous-length, irregularly shaped workpiece 1, exclusive-use jigs that match the sectional shape of the workpiece are not needed.

Also, since un-notched cylindrical rings 15a are supported so as to be capable of rotating around the horizontal axis O, the rings can rotate 360°, and the machined object does not need to be rotated in the opposite direction even in cases in which the entire peripheral surface of the long workpiece 1 is machined.

Since the two clamp units 14 can move toward the outside of the ends of the long workpiece 1 and can be moved horizontally to convey the long workpiece 1 in or out, extra space is not needed to convey the long workpiece 1 in or out.

The two support units 16 are moved to their raised positions to horizontally support the long workpiece 1 at two locations, the clamp units 14 are released and moved horizontally in the length direction of the long workpiece 1, the long workpiece 1 is held horizontally at two different locations, and the two support units 16 are then moved to their lowered positions and separated from the long workpiece 1. The held portions of the long workpiece 1 can thereby be automatically machined, whereby machining of a continuous-length, irregularly shaped workpiece can be automated other than at times during which the workpiece is conveyed in and out.

INDUSTRIAL APPLICABILITY

Additionally, the present invention has been described by some preferable embodiments, and it will be understood that the scope of right included in the present invention is not limited by the embodiments. On the contrary, the scope of right of the present invention includes all of improvements, modifications, and equivalents included in the scope of the appended claims.

What is claimed is:

1. A long workpiece machining apparatus for machining a long workpiece having a constant sectional shape while rotating the long workpiece around a horizontal axis O extending in the length direction of the long workpiece, the long workpiece machining apparatus comprising:

a base frame that is positioned below the horizontal axis O and that extends along the horizontal axis O;

a pair of clamp units that are positioned at the two ends of the base frame;

a pair of support units that are positioned in the lengthwise inside of the clamp units, that are capable of moving along movement guides disposed parallel to the horizontal axis O, that horizontally support the long workpiece in two locations, and that are capable of moving vertically; and one or a plurality of machining units that are capable of moving over the base frame along movement guides disposed parallel to the horizontal axis O, and that are capable of machining the long workpiece; wherein the clamp units are capable of moving from the outside of the ends of the long workpiece toward the inside;

the clamp units horizontally support the long workpiece in two locations; and the clamp units rotate in synchronization with each other around the horizontal axis O;

each of said clamp units comprising:

a cylindrical ring that has a cylindrical inner surface and is supported so as to be rotatable around the horizontal axis O;

an intersecting flat member which is attached to the inner surface of the cylindrical ring and which has two flat surfaces extending in parallel with the horizontal axis and crossing each other; and a holding head disposed in the cylindrical ring in a position opposite to the intersecting flat member, directly moved in a diametrical direction relative to the cylinder ring and thus toward the intersecting flat member, and freely rocked around an axis parallel to the horizontal axis O;

wherein each of said support units have a pair of free-rotating rollers that are supported at the lower ends so as to rotate freely around an axis, and that intersect with each other to form a V shape that opens upward;

the free-rotating rollers are capable of moving along the horizontal axis O in the lengthwise inside of the clamp units, and are also capable of vertical movement; and while the free-rotating rollers are at raised positions, the V shapes are coplanar with V shapes of the upper surfaces of the intersecting flat members of the clamp units when the intersecting flat members are at bottom positions.

2. The long workpiece machining apparatus according to claim 1, each of said machining units comprising:

a spindle for rotating rotary tools; and a tool-moving device for moving the rotary tool in two dimensions within a plane orthogonal to the horizontal axis O.

3. The long workpiece machining apparatus according to claim 1, comprising:

a NC control device for numerically controlling the horizontal movement positions and rotational angles of the clamp units as well as the positions of the rotary tools of the machining units; and a sequence control device for controlling the sequence of the units.

4. The long workpiece machining apparatus according to claim 1, comprising:

a stationary-side stopper sensor that is fixed to a first end of the base frame and that comes into contact with one end of the long workpiece and outputs a detection signal; and a moving-side stopper sensor that is capable of moving from the other end of the base frame to the first end along the horizontal axis O, and that comes into contact with the other end of the long workpiece and outputs a detection signal.

* * * * *